Jan. 15, 1946.  E. GASPAR  2,393,155
FORGING POINTED ARTICLES
Filed Oct. 3, 1940
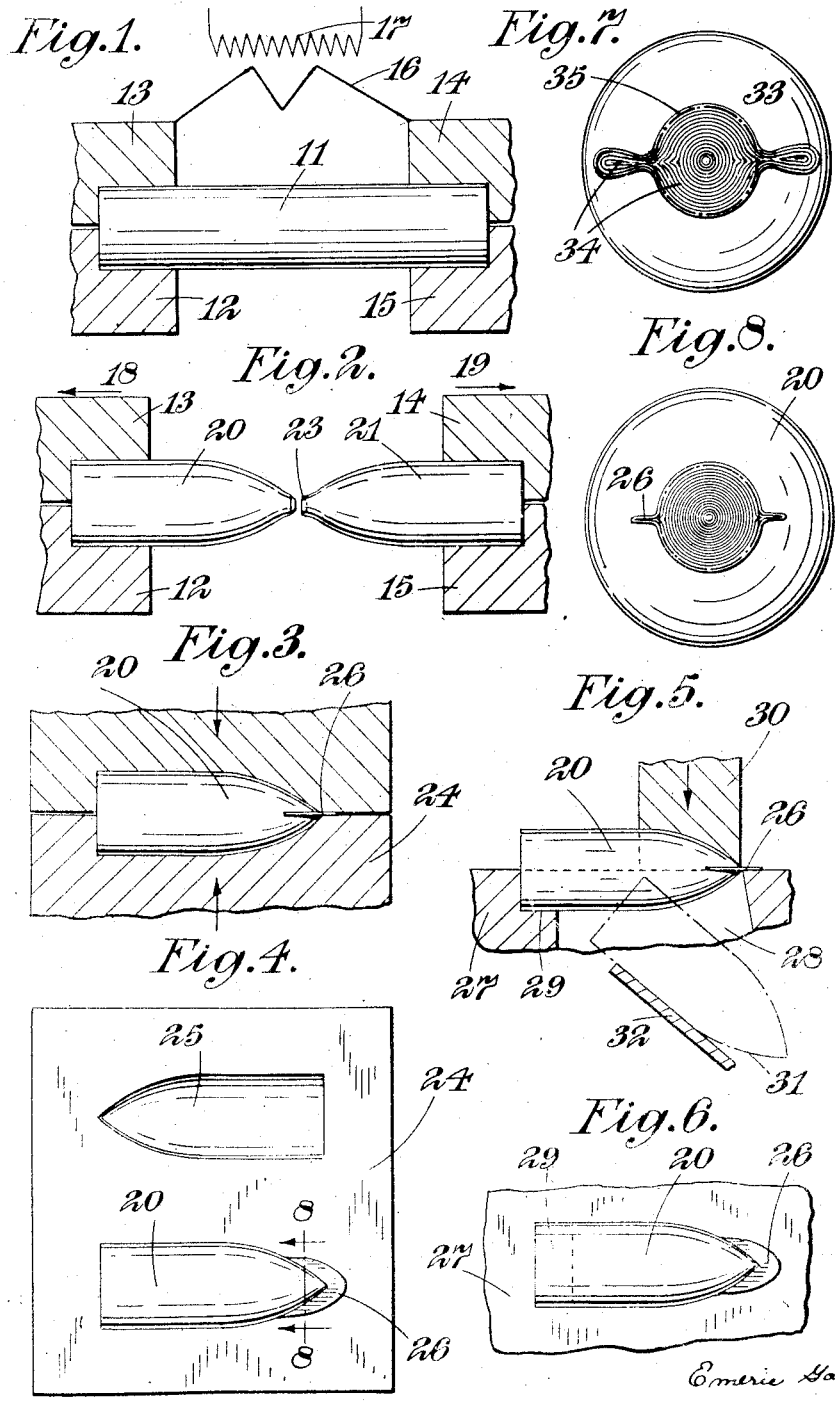

Patented Jan. 15, 1946

2,393,155

UNITED STATES PATENT OFFICE 2,393,155

FORGING POINTED ARTICLES

Emeric Gaspar, Barnes, London, England, assignor to Omes Limited, Barnes, London, England, a British company Application October 3, 1940, Serial No. 359,622
In Great Britain June 23, 1939

4 Claims. (Cl. 29—1.22)

This invention comprises improvements in or relating to forging pointed articles. It is an object of the present invention to provide an improved process for the manufacture of pointed projectiles.

Such projectiles can be produced by machining or by drop-forging from black bar. When machined, the grain of the metal is cut through by the machining operation and the bullet is expensive and inferior. When drop-forged between split dies in the usual manner, a considerable "flash" is produced at the pointed end of the projectile which has to be cut off and wasted, and where the "flash" is cut, the grain of the metal turns outward into the cut portion so that the objectionable cutting through of the grain of the metal which is noticed in connection with pieces which are wholly machined is present in the drop-forged form also to this extent.

It has been proposed to produce bullets by heating them electrically over the zone which is to be pointed and applying tension to the metal so as to draw it out into two pointed workpieces having approximately the shape desired but it has been found difficult to obtain any exactitude in the shape by this method while there is a tendency with certain types of steels for one of the workpieces produced to part from the other with a crater-like fracture or a small pipe which renders the bullet useless.

According to the present invention a process for the manufacture of projectiles comprises in combination the steps of—

(a) electrically heating the central zone of a workpiece large enough to produce two projectiles;
(b) subjecting the heated workpiece to tension to draw it into pointed blanks having points longer than the points desired in the finished product;
(c) pressing the points by lateral pressure in a split die to bring the points approximately to the desired shape;
(d) thereafter removing the surface of the blanks around the point.

In the pressing operation when the blanks originally produced by drawing out into points are pressed, the effect is to produce a small flash at the point of each of the workpieces where the metal has been drawn out too long, without materially altering the run of the grain of the metal. The small flash thus produced can be cut off and does not involve substantial waste. At the same time, if any tendency to forming a pipe or a crater exists in the tip of the metal workpiece, this is squeezed out and done away with in the pressing operation. The subsequent machining to finished shape involves the removal of very little metal. Moreover, the above-described cutting-through of the grain of the metal is avoided as hereinafter described.

One method of carrying the invention into effect will now be described, by way of example, with reference to the accompanying drawing, in which—

Figure 1 is a diagram of the workpiece during the heating stage of the process according to the invention;

Figure 2 is a diagram of the drawing stage;

Figure 3 is a section of a die during the die-pressing stage;

Figure 4 is a plan of one of the dies shown in Figure 3;

Figure 5 is a diagram of the operation of cutting off the "flash";

Figure 6 is a plan of part of Figure 5;

Figure 7 is a diagrammatic representation of a workpiece when produced by drop forging;

Figure 8 is a similar view of a workpiece when produced according to this invention.

Referring to Figure 1, a workpiece 11 is rigidly held between divided vice-electrodes 12, 13 at one end and 14, 15 at the other. The electrodes 12 and 13 are connected to one terminal of a low tension step-down transformer secondary winding 16, the primary winding 17 of which is supplied from the mains. As a result the workpiece is heated in the centre, though not at the ends, to forging temperature. When sufficiently heated the vices 12 and 15 are drawn apart as indicated by the arrows 18, 19 in Figure 2, thus drawing the workpiece out into two pointed blanks 20, 21, sufficient to make two projectiles. As indicated at 23 the blanks may part with a small crater-like break.

While still hot the bullets are taken from the machine which contains the vice jaws 12, 15 and placed in a die the lower member of which is shown at 24, Figures 3 and 4. This die has recesses 25 corresponding to the shape of one half of the desired finished forging, which is to say the recesses are a little smaller at the point than the blanks 20, 21. The upper die is similarly shaped and is brought down, in a press or hammer, on to the still hot workpieces, to stamp them to shape. This closes the crater, if any, in the point of the workpiece and forces the metal of the crater outward into a small "flash" 26. The die 24 is shown in Figure 4 after removal of one of the workpieces, so that the recess 25 which has received it can be seen.

In the next operation the blanks 20, 21 are placed one at a time in a die 27 (Figures 5 and 6). This die has an aperture 28 with a cutting edge of the same outline as the desired finished forging. The blank rests at the back end on a ledge 29 and at the point is supported by its flash 26. It can be easily inserted by means of tongs. A punch 30 cuts off the flash and the completed forging then drops through die opening 28 point-first, as indicated by chain line 31, on to a chute 32 which guides it to a discharge point.

At this stage the forging may be soaked in a heated atmosphere or a lead or salt bath and slowly cooled to normalise it and relieve stresses caused by the forging operation.

After the completion of the forging operations the blank can be machined to size by grinding or turning in the usual way.

Owing to the method of forging adopted the forging is close to size and very little metal has to be removed. If the previously usual method of drop-forging from the bar is employed, there is a large flash at the point as indicated at 33, Figure 7. In this view the grain of the metal in a section near the point of the forging is indicated by lines 34 and the line to which the forging must be machined is shown by chain line 35. It will be seen how the machining cuts through the grain.

Figure 8 is a similar view of a forging produced according to this invention showing the flash 26 and how only the outer layer of the metal has a grain which goes into the flash. Consequently the distortion of the grain of the metal by the flash is reduced to an amount such that the small amount of machining required is sufficient to remove the distorted grain and leave only a substantially symmetrical crystalline disposition below the machined surface. Thus the difficulty of producing a sound machined projectile is overcome. The machining of grooves around the base of the projectile for a copper driving band or other detail machining operations would follow easily in the usual way.

It will be seen therefore that bullets produced in accordance with the present invention are not only made accurately to size and produced with very little removal of metal in trimming or machining operations, thus saving steel, but also, owing to the drawing operation by which the points are produced, the grain of the metal runs parallel with the face of the projectile right to the point; it is not substantially interfered with by the pressing operation where the small flash at the point is produced; and the final machining to shape therefore takes off a uniform skin of the metal all over the pointed end and the sides of the projectile just sufficient to get below any distortion of the grain due to the "flash" and thus to avoid substantially cutting across the grain at any place. Therefore, the projectiles are stronger, cheaper and more homogeneous than those produced by methods heretofore in use.

I claim:

1. A process for the manufacture of projectiles comprising in combination the steps of (a) electrically heating the central zone of a workpiece large enough to produce two projectiles; (b) subjecting the heated workpiece to tension to draw it into pointed blanks having points longer than the points desired in the finished product; (c) pressing the points by lateral pressure in a split die to bring the points approximately to the desired shape; and (d) thereafter removing the surface of the blank around the point.

2. A process for the manufacture of projectiles comprising, in combination, the steps of heating at least the central zone of a workpiece large enough to produce two projectiles; subjecting the heated workpiece to tension to draw it into pointed blanks having points larger than the points desired in the finished product; pressing the points by lateral pressure to bring the points approximately to the desired shape; removing the flash produced by the pressing operation; and thereafter removing the surface of the blank around the point.

3. A process for the manufacture of projectiles comprising, in combination, the steps of heating at least the central zone of a workpiece large enough to produce two projectiles; subjecting the heated workpiece to tension to draw it into pointed blanks having points larger than the points desired in the finished product; pressing the points by lateral pressure to bring the points approximately to the desired shape; removing the flash produced by the pressing operation by supporting the forging at spaced points longitudinally thereof, solidly beneath the rear end thereof and also beneath the flash adjacent the forward end; applying pressure to the forward end of the projectile in a downward direction, whereby the flash is sheared off and the projectile delivered downwardly point first; and thereafter removing the surface of the blank around the point.

4. A process for the manufacture of projectiles comprising, in combination, the steps of heating at least the central zone of a workpiece large enough to produce two projectiles; subjecting the heated workpiece to tension to draw it into pointed blanks having points larger than the points desired in the finished product; pressing the points by lateral pressure to bring the points approximately to the desired shape; normalizing the projectile so as to relieve stresses caused by the operations described; and thereafter removing the surface of the blank around the point.

EMERIC GASPAR.